United States Patent [19]
Ito et al.

[11] Patent Number: 5,793,631
[45] Date of Patent: Aug. 11, 1998

[54] VOICE ROUTE-GUIDANCE SYSTEM AND METHOD HAVING A FUNCTION FOR JUDGING APPROACHMENT TO A DECISION POINT

[75] Inventors: Toru Ito, Nagoya; Hiroshi Kishi, Toyota; Atsushi Watanabe, Aichi-Gun; Mitsuhiro Nimura, Okazaki; Akimasa Nanba, Chiryu; Toyoji Hiyokawa, Toyota; Shigekazu Ohara, Chiryu; Kazuteru Maekawa, Nishikamo-gun; Shinichi Katoh, Anjo, all of Japan

[73] Assignee: Aisin AW Co., Ltd., Anjo, Japan

[21] Appl. No.: 400,005

[22] Filed: Mar. 6, 1995

Related U.S. Application Data

[63] Continuation of Ser. No. 107,368, Aug. 17, 1993, abandoned.

[30] Foreign Application Priority Data

| Aug. 19, 1992 | [JP] | Japan | 4-219527 |
| Aug. 19, 1992 | [JP] | Japan | 4-219968 |
| Aug. 19, 1992 | [JP] | Japan | 4-220248 |
| Aug. 19, 1992 | [JP] | Japan | 4-220249 |

[51] Int. Cl.$^6$ ............ G06G 7/78; G08G 1/123
[52] U.S. Cl. ............ 364/449.5; 364/449.2; 364/449.4; 364/444.2; 364/424.029; 340/990; 340/995; 73/178 R
[58] Field of Search ............ 364/444, 449, 364/443, 424.02, 424.01, 450, 457, 449.1, 449.2, 449.3, 449.4, 449.5, 449.8, 444.1, 444.2, 424.029, 424.027, 424.028, 454, 453; 340/990, 995, 988; 73/178 R; 342/450, 451, 457

[56] References Cited

U.S. PATENT DOCUMENTS

| 4,700,302 | 10/1987 | Arakawa et al. | 364/449 |
| 4,758,959 | 7/1988 | Thoone et al. | 364/454 |
| 4,774,671 | 9/1988 | Itoh et al. | 364/449 |
| 4,937,752 | 6/1990 | Nanba et al. | 364/457 |

(List continued on next page.)

FOREIGN PATENT DOCUMENTS

| 1173815 | 7/1989 | Japan . |
| 1173817 | 7/1989 | Japan . |
| 1173819 | 7/1989 | Japan . |
| 23899 | 1/1990 | Japan . |
| 24285 | 1/1990 | Japan . |
| 2103584 | 4/1990 | Japan . |
| 3137679 | 6/1991 | Japan . |
| 3269317 | 6/1991 | Japan . |
| 2111204 | 6/1983 | United Kingdom . |

OTHER PUBLICATIONS

Davis et al; Vehicle Navigation & Information Systems; IEEE US; Sep. 1989; pp.146–150.

Patent Abstract of Japan vol. 14, No. 183 (P–1035) Apr. 1990 re JP–A 2029900.

Davis et al; Vehicle Navigation & Information Systems; IEEE US; Sep. 1989; pp. 146–150, entitled "The Back Seat Driver: Real Time Spoken Driving Instructions".

Patent Abstract of Japan vol. 14, No. 183 (P–1035) Apr. 1990 re JP–A–2029900.

*Primary Examiner*—Jacques Louis-Jacques
*Attorney, Agent, or Firm*—Cushman, Darby & Cushman IP Group of Pillsbury, Madison & Sutro LLP

[57] ABSTRACT

A voice route-guidance system for vehicles which terminates its route-guidance when the vehicle arrives at the destination and even if the present position of the vehicle is measured with low accuracy. An approach judging unit judges that the vehicle approaches a point spaced apart from a destination by a predetermined distance. A guidance termination judging unit further judges whether or not there is a point in which the route-guidance should be carried out between the present vehicle position and the destination. From these judgments, the system judges that the vehicle approaches the point spaced apart from the destination by the predetermined distance and also that all the route-guidance has been terminated. Thus, a termination unit terminates the route-guidance.

24 Claims, 15 Drawing Sheets

U.S. PATENT DOCUMENTS

| | | | |
|---|---|---|---|
| 4,999,783 | 3/1991 | Tenmoku et al. | 364/449 |
| 5,177,685 | 1/1993 | Davis et al. | 364/443 |
| 5,243,528 | 9/1993 | Lefebvre | 364/449.5 |
| 5,262,774 | 11/1993 | Kuwahara et al. | 364/449 |
| 5,274,560 | 12/1993 | La Rue | 364/444 |
| 5,283,575 | 2/1994 | Kao et al. | 340/995 |
| 5,283,595 | 2/1994 | Kao et al. | 340/995 |
| 5,291,413 | 3/1994 | Tamai et al. | 364/449 |
| 5,293,163 | 3/1994 | Kakihara et al. | 364/449 |
| 5,311,434 | 5/1994 | Tamai | 340/990 |
| 5,343,399 | 8/1994 | Yokoyama et al. | 364/449 |
| 5,359,527 | 10/1994 | Takanabe et al. | 364/444 |
| 5,359,529 | 10/1994 | Snider | 364/449 |
| 5,365,448 | 11/1994 | Nobe et al. | 364/444 |
| 5,394,332 | 2/1995 | Kuwahara et al. | 364/449.5 |

⇓ ARRIVAL

↓ GUIDANCE START SWITCH

⇓ RE-SEARCH SWITCH

⇓ GUIDANCE START

VOICE ROUTE-GUIDANCE SYSTEM AND METHOD HAVING A FUNCTION FOR JUDGING APPROACHMENT TO A DECISION POINT

This is a continuation of application Ser. No. 08/107,368, filed on Aug. 17, 1993 now abandoned.

BACKGROUND OF THE INVENTION i) Field of the Invention

The present invention relates to a route-guidance system mounted in a vehicle for guiding the vehicle to a goal or destination along a course and particularly to such a route-guidance system which can audibly and/or visually inform an operator of a course to be selected at a diverging point.

ii) Description of the Related Art

Various types of devices for relieving the load on a driver have been proposed and are increasingly being mounted in vehicles. One such device is a route-guidance system for guiding a vehicle to a destination along a course. Such a route-guidance system has a function that informs the driver of a course to be selected as the vehicle is to move past a diverging point such as a crossroads, crossing and so on. Such route-guidance systems practically used at present include a display unit which is mounted within the instrument panel of the vehicle and adapted to visually inform the driver of the selected course.

There is also known a route-guidance system for audibly informing the driver of the selected course in addition to such visual information. For example, Japanese Patent Laid-Open No. Hei 1-173819 discloses a voice route-guidance system which can audibly announce a course to be selected when a vehicle in which the system is mounted reaches a position at a distance before an intersection or crossing. When such a voice route-guidance system is used, the driver can concentrate his or her mind on the view in front of the moving vehicle without the need to look at the display.

It is further preferred that the route-guidance is carried out slightly before the vehicle reaches the intersection or crossing. If the guidance is made immediately before an intersection, the driver may not promptly respond to the guidance. For example, in countries where cars travel on the righthand side of the road when the vehicle is moving on a two-lane road along the left-side lane thereof and if the driver is suddenly instructed "turn to the right" by the route-guidance system at an intersection, the driver cannot promptly turn his or her vehicle to the right. The driver must first move the vehicle from the left-side lane to the right-side lane before the vehicle is turned to the right at the intersection. Time is required to turn the vehicle to the right or left at the intersection.

For such a purpose, a previous notice must be made before the vehicle reaches the intersection, as described. The guidance will also be performed immediately before the intersection. Such a stepped guidance is preferable in that the driver can smoothly operate his or her vehicle while being guided by the route-guidance system.

When the vehicle reaches the destination, it is audibly announced to the driver and the route-guidance will be terminated.

If the present position of the vehicle is measured with reduced accuracy, however, the actual arrival at the destination cannot be judged by the route-guidance system. Therefore, the route-guidance system may not be terminated.

If the measurement is low in accuracy and when a route from a start point to a goal via a point is selected, the following problem may also arise. When such a route is set in the route-guidance system, the point via which the vehicle passes to the destination (which will be referred to as a "transit point") is first searched as a first destination and a first route from the starting point to the transit point is then determined. Subsequently, a second route from the transit point to the final destination is searched and determined. If the arrival at the first destination is not determined, the guidance relating to the second route cannot be initiated. More particularly, when the measurement is low in accuracy or if the vehicle has passed through a point slightly spaced apart from the transit point, the arrival at the transit point cannot be judged, so that the first route-guidance will not be terminated. Thus, the route-guidance to the final goal will not be initiated.

SUMMARY OF THE INVENTION

In order to overcome the above problems of the prior art, it is an object of the present invention to provide a route-guidance system which can terminate its route-guidance operation by judging an arrival at a destination even if a vehicle moves closer to that destination by a predetermined distance, for example, even if the measurement of the present vehicle position is low in accuracy or even if the vehicle has moved without passage of a transit point set in the route-guidance system.

To this end, the present invention provides a route-guidance system comprising approach judgment means for judging that a vehicle approaches a point spaced apart from a destination by a predetermined distance; guidance termination judging means for judging whether or not a final route-guidance has been carried out when the vehicle approaches said point within said predetermined distance; and guidance terminating means for terminating the route-guidance with a message when said approach judgment means judges the approach of the vehicle to the destination and when said guidance termination judging means judges that the final route-guidance has been performed.

A method of guiding a vehicle under a voice route-guidance, comprising the steps of storing data relating to a route to a destination; detecting the present position of a vehicle; judging that the vehicle approaches a point spaced apart from the destination by a predetermined distance; judging whether or not the final route-guidance has been carried out; and terminating the route-guidance with a message when it is judged that the vehicle approaches the destination and when it is judged that the final route-guidance has been performed.

The route-guidance system of the present invention can terminate its route-guidance by considering the approach of the vehicle to within the predetermined distance of the destination as the vehicle arrives at the destination. At this time, the termination of the route-guidance is audibly and/or visually reported to the driver.

DETAILED DESCRIPTION OF THE PREFERRED EMBODIMENTS

Figure 1:
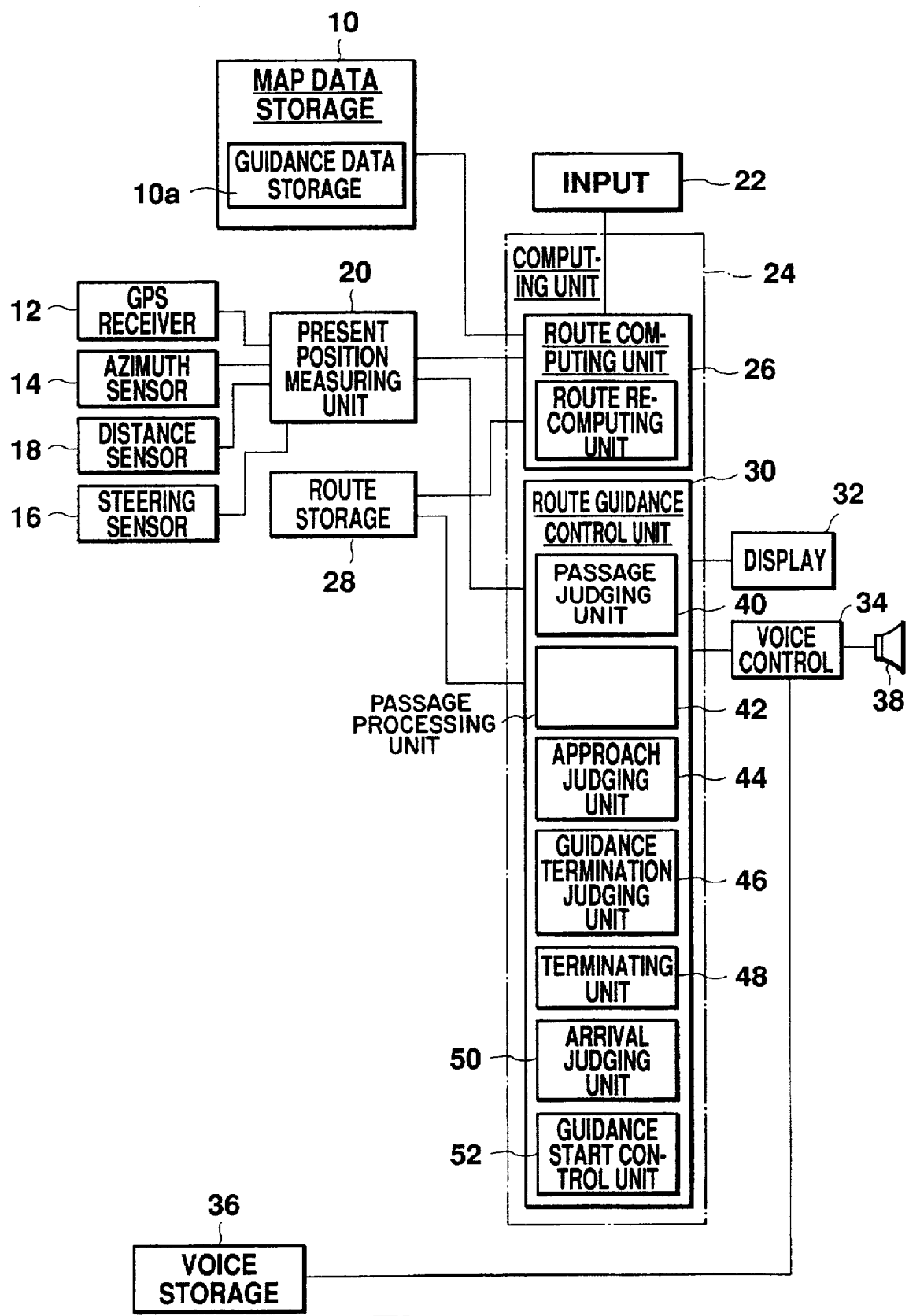
FIG. 1 is a block diagram of one preferred embodiment of a voice route-guidance system constructed in accordance with the present invention.

Referring to FIG. 1, there is shown a voice route-guidance system constructed in accordance with the present invention. The system comprises a map data storage unit 10 which is adapted to store data of road names, place names, intersection names, building names, river names and other names and to read out these stored data, if necessary. The voice route-guidance system also comprises a GPS receiver 12 utilizing a satellite navigation system (GPS) for measuring the present position of a vehicle in which the voice route-guidance system is mounted, an azimuth sensor 14 for sensing the azimuth of movement of the vehicle from changes in the terrestrial magnetism, a steering sensor 16 for sensing the changed course from the changed angle of a steering wheel in the vehicle, a distance sensor 18 for sensing a distance through which the vehicle has run from the revolution of a vehicle wheel, and a present position measuring unit 20 for determining the present position of the vehicle from the results of said sensors.

When route-guidance is to be performed, a destination is provided to a computing unit 24 through an input section 22 such as by specifying the destination on a display unit which will be described or by typing the place name of the destination. The computing unit 24 includes a route computing unit 26 which computes a route from the present position of the vehicle computed by the present position measuring unit 20 to the input destination. The determined route is then stored in a route storage unit 28.

After the route has been determined in the above manner, actual route-guidance is initiated. The computing unit 24 includes a route-guidance control unit 30 which reads out the data of a map around the vehicle from the map data storage unit 10, the map being displayed on a display unit 32 overlapping the present position and direction of the vehicle and the determined route that has been stored in the route storage unit 28.

The display unit 32 is mounted in an instrument panel adjacent to the driver's seat of the vehicle. The driver can see the display unit 32 to confirm the position of the vehicle and to obtain information relating to the route.

Figure 2:
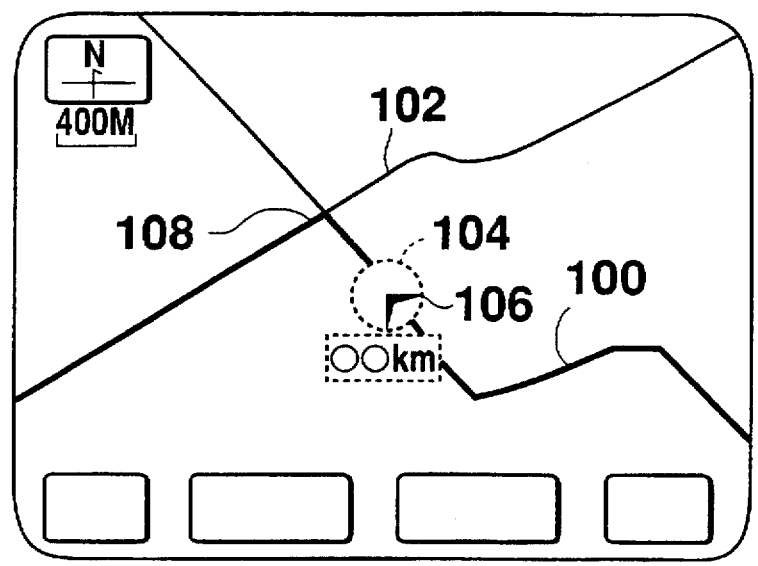
FIG. 2 is a scene displayed by the voice route-guidance system.

One scene in the display unit 32 is shown in FIG. 2. The selected route is designated by a thick line 100 and the other road is denoted by 102. The position of the vehicle is indicated by a circle 104, with the direction of movement thereof being shown by a wedge-shaped arrow 106. Such a scene may be colored in place of or in addition to the distinction made by the lines of different thickness.

Figure 3:
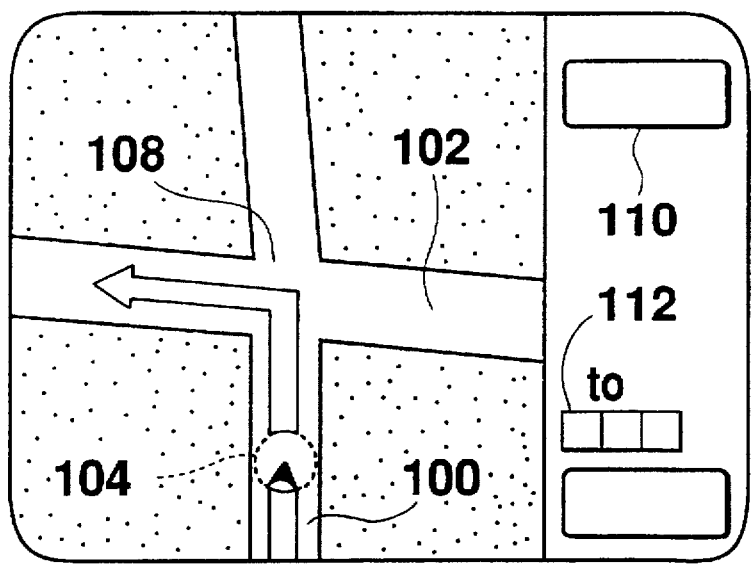
FIG. 3 is another scene displayed, in an enlarged scale, by the voice route-guidance system, showing that the vehicle is approaching an intersection at which the vehicle should be turned to the right or left.

As the vehicle approaches an intersecting point 108 at which the vehicle should be turned, the scene is varied to one shown in FIG. 3. This scene shows the name 110 of the intersecting point 108 and a distance 112 between the vehicle and the intersecting point 108. At the same time, the route-guidance control unit 30 causes a voice control unit 34 to generate an audible message announcing the route-guidance at the intersection. The voice control unit 34 reads out digital data from a voice storage unit 36 and converts it into an analog signal which in turn drives a speaker 38. The speaker 34 thus produces the audible message, for example, "turn to the left at the next intersection" to the driver. Such an audible message is repeated at distance intervals until the vehicle has passed through the intersection.

If a transit point is input from the input section 22 into the computing unit 24 along with the destination, the route computing unit 26 then computes a route from the start point through the set transit point to the destination. Similarly, this route is stored in the route storage unit 28. The route may be searched by first setting the transit point as a temporary destination and searching a route from the present position to the transit point, in any suitable manner such as the Dykistra method or the like. Next, a route from the transit point as a start point to the actual or final destination is searched. Finally, the second route is connected to the first route.

Thus, the route-guidance system of this embodiment can visually or audibly guide the vehicle along a selected route such that the vehicle will reliably move past a selected transit point, but also is characterized in that the guidance of the routes between the present point and the transit point and between the transit point and the final destination are independently carried out. For such a purpose, the route-guidance system comprises a passage judging unit 40 for judging whether or not the vehicle has passed through the selected transit point and a passage processing unit 42 for switching the route-guidance from between the start point and the transit point to another route-guidance for between the transit point and the destination when it is judged that the vehicle has passed through the transit point.

Figure 4:
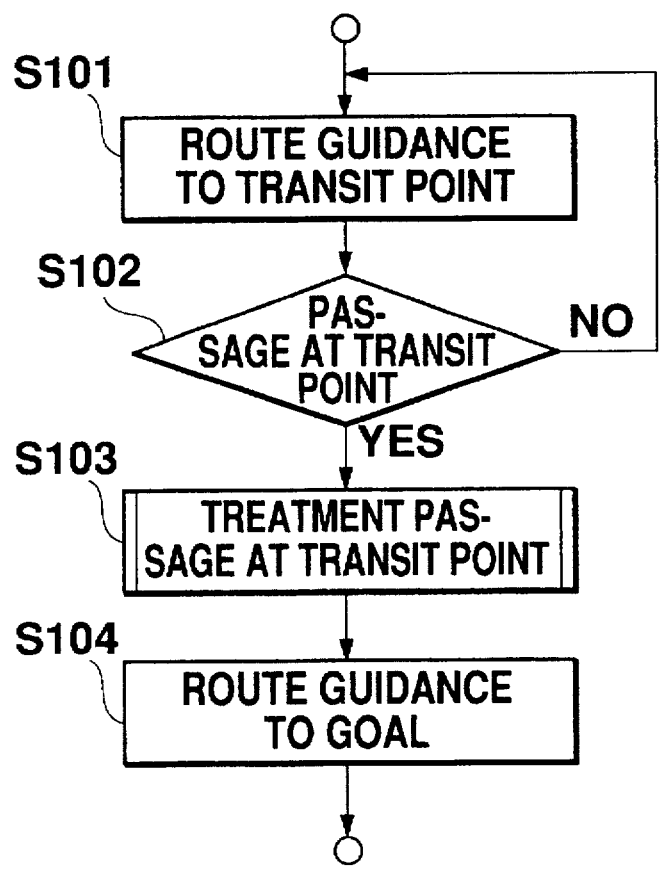
FIG. 4 is a flowchart illustrating a procedure taken before the vehicle moves past a transit point.

FIG. 4 shows a flowchart illustrating the route-guidance according to this embodiment. The route computing unit 26 computes a route from the start point to the transit point and the route storage unit 28 stores such a route along which the vehicle is visually or audibly guided (S101). This route is colored by a red line in the scene. Another route from the transit point to the final destination is colored by a blue line. The passage judging unit 40 judges whether or not the vehicle has passed through the transit point.

Figure 5:
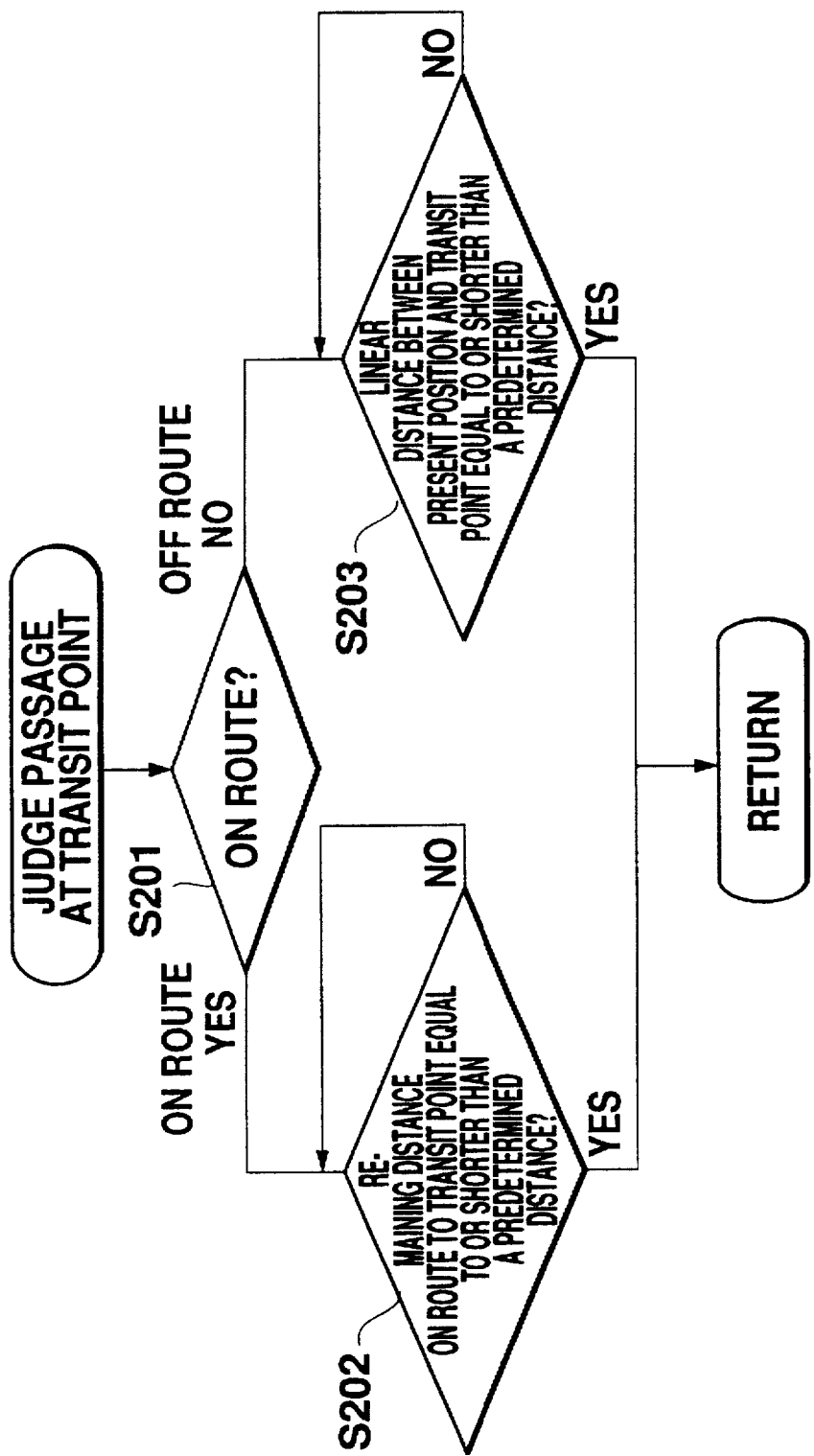
FIG. 5 is a flowchart illustrating a procedure taken when it is judged whether or not the vehicle moves past the transit point.

FIG. 5 shows a flowchart illustrating when it is judged whether or not the vehicle has moved past the transit point. More particularly, it is first judged whether the vehicle properly moves along the specified route (S201). This is performed by comparing the present position of the vehicle with the route. When it is judged that the vehicle properly moves along the route, it is further judged whether or not the remaining distance from the present position to the transit point is within a predetermined distance (e.g. 200 meters) (S202). If the remaining distance is equal to or smaller than 200 meters, it is judged that the vehicle has passed through the transit point.

If the vehicle is not properly moving along the route, it is judged whether or not the linear distance between the present vehicle position and the transit point is equal to or smaller than a predetermined value (e.g. 200 meters) (S203). If the distance is equal to or smaller than 200 meters, it is then judged that the vehicle has passed through the transit point.

It is thus judged at S102 that the vehicle has passed through the transit point, and the procedure proceeds to a transit point passage processing step (S103). This step is executed by the passage processing unit 42 when it receives a passage signal from the passage judging unit 40.

Figure 6:
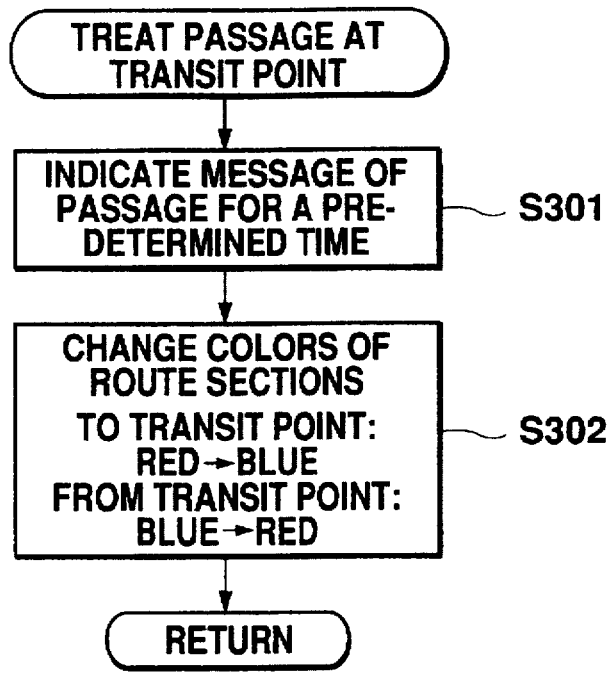
FIG. 6 is a flowchart illustrating a procedure taken when the vehicle has passed through the transit point.

FIG. 6 shows a flowchart of a procedure performed when the vehicle has passed through the transit point. If it is judged that the vehicle has moved past the transit point, the system causes the display unit 32 to display a message indicating a predetermined time required for the vehicle to move past the transit point, for example, 30 seconds (S301). Colors used to indicate the route are changed (S302). More particularly, before the vehicle moves past the transit point, the first route section from the start point to the transit point is indicated by a red-colored line while the second route section from the transit point to the final destination is indicated by a blue-colored line. After the vehicle has passed through the transit point, however, the first route section is indicated by a blue-colored line while the second route section is indicated by a red-colored line.

Figure 7A:
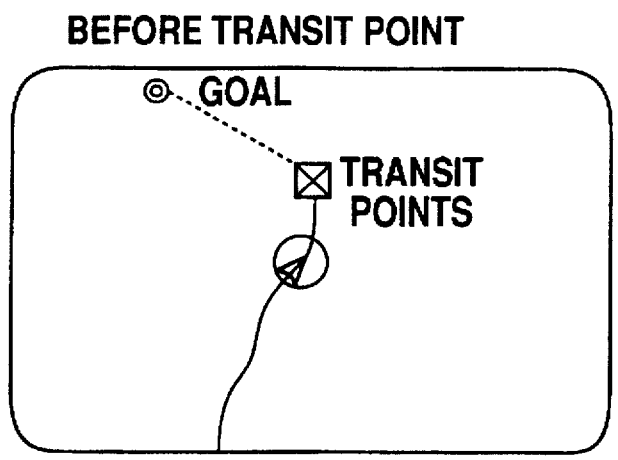
FIG. 7A is a scene showing the position of the vehicle when it moves to the transit point.
Figure 7B:
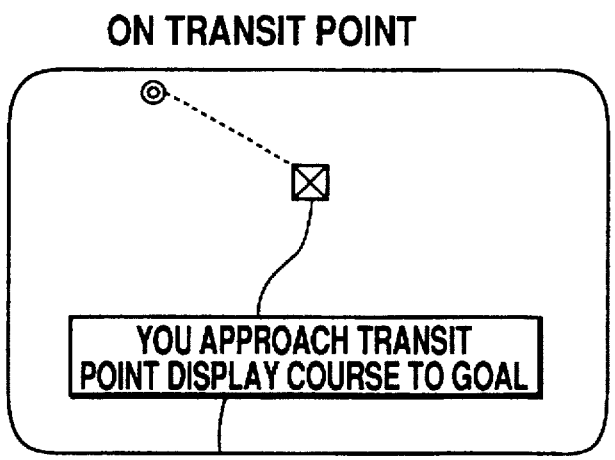
FIG. 7B is a scene showing the position of the vehicle when it approaches the transit point.
Figure 7C:
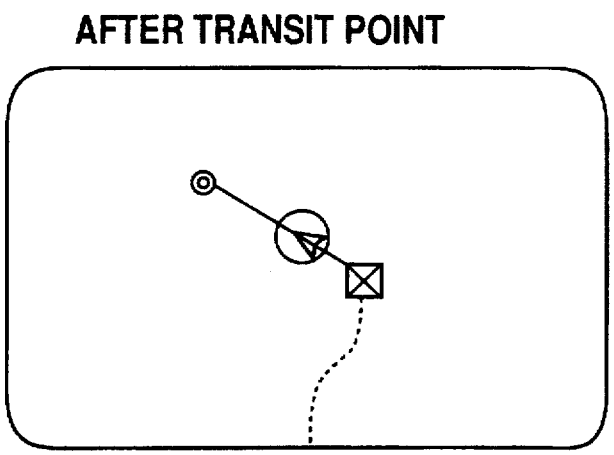
FIG. 7C is a scene showing the position of the vehicle when it has moved past the transit point.

FIGS. 7A, 7B and 7C show various different scenes in the display unit 32 before, during and after passing of the transit point, respectively. FIG. 7A shows that before the vehicle passes through the transit point, a course to the transit point is indicated by a solid line (red) while another course from the transit point to the destination is indicated by a broken line (blue). As the vehicle moves past the transit point, the display unit 32 indicates a message, "You are approaching the transit point. Course to destination is shown.", as shown in FIG. 7B. After the vehicle has passed through the transit point, the course to the transit point is shown by a broken line (blue) while the course from the transit point to the destination is shown by a solid line (red), as shown in FIG. 7C.

When the vehicle is off the selected route and if it has moved past the transit point, the route from the present position of the vehicle to the destination is re-searched as in the conventional navigation systems. In this embodiment, however, the route-guidance system is adapted to perform two independent route-guidance operations, that is, a route-guidance from the start point to the transit point and another route-guidance from the transit point to the destination. More particularly, since the route-guidance is precisely made until the vehicle passes through the transit point, only the route from the present vehicle position to the transit point may be re-searched, rather than the route from the present vehicle position to the destination. Such a re-search is initiated when the route computing unit 26 is actuated through the input section 22 to determine a new route which in turn is stored in the route storage unit 28. The input section 22 may be in the form of touch-sensitive switches in the display unit 32.

Figure 8:
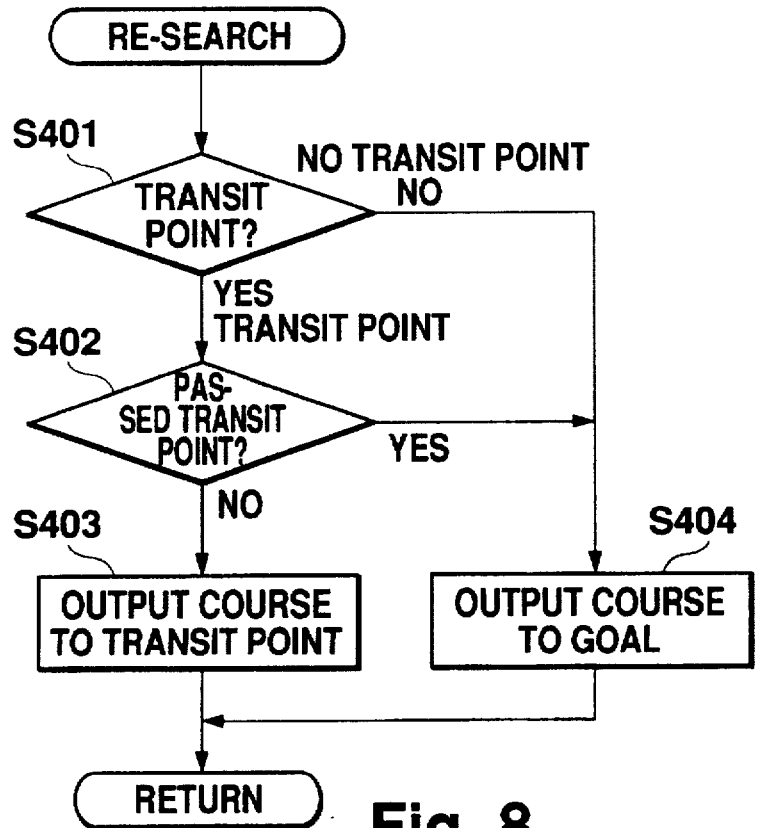
FIG. 8 is a flowchart showing the procedure when a researching operation is carried out.

FIG. 8 shows a flowchart of a re-search procedure performed when the vehicle is off route. First of all, it is judged whether or not the transit point has been set (S401). If the passage point has been set, the transit judging unit 40 then judges whether or not the transit point is passed by the vehicle (S402). If the vehicle has not yet moved past the transit point, a new course from the present vehicle position to the transit point which was obtained by the re-search is output (S403). If the transit point has not been set or if it is judged that the vehicle has already passed through the transit point, another new course from the present vehicle position to the destination which was obtained by the re-search is output (S404).

The route-guidance system of this embodiment can research a course through the transit point even when the vehicle is off the route and if the vehicle has not yet moved past the transit point. The re-searched course is shown to the driver. The vehicle can be precisely guided to pass the transit point.

The route-guidance system of this embodiment can set a preferential course along which the vehicle preferentially runs on a toll road from the present vehicle position to the transit point through touch-sensitive switches in the display unit 32. The route-guidance system can further set another preferential course along which the vehicle preferentially runs on a toll road from the transit point to the destination. When the preferential course from the present vehicle position to the transit point is specified, the route computing unit 26 preferentially searches for a toll road contained in the map data between the present vehicle position to the set transit point and computes a route from the transit point to the destination, which in turn is stored in the route storage unit 28. If the preferential course from the transit point to the destination is specified through the input section 22, the route computing unit 26 preferentially searches for a toll road contained in the map data from the set transit point to the destination and computes a course to the destination which in turn is stored in the route storage unit 28.

Figure 9:
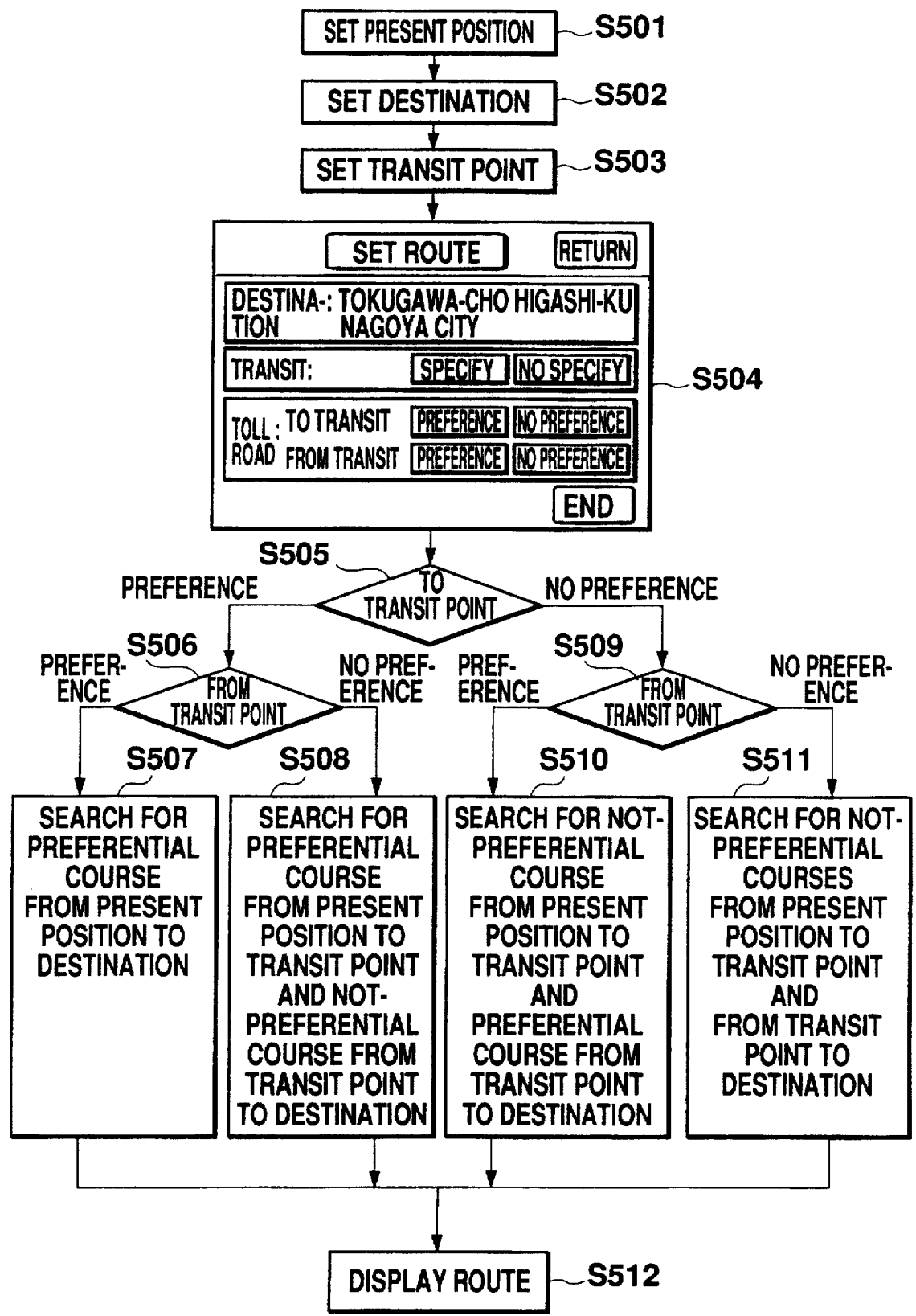
FIG. 9 a flowchart illustrating the procedure when a transit point and toll road to be used are specified.

FIG. 9 shows a flowchart of a procedure carried out in this embodiment. First of all, the present vehicle position, destination and transit point are set through the input section 22 (S501, S502 and S503). The display unit 32 shows a route setting scene as in S504. This scene includes items of "destination", "transit point" and "toll road". The "transit point" item includes two different touch-sensitive switches, "specify" and "not specify". The "toll road" item includes four different touch-sensitive switches, "toll road preference to transit point", "no toll road preference to transit point", "toll road preference from transit point" and "no toll road preference from transit point". By selectively actuating these switches, the driver can select any option, for example, an option that after the vehicle has moved past the transit point, it preferentially runs on a toll road.

After a route has been set, the computing unit 24 searches for a route corresponding to the set option. More particularly, at S505, it is judged whether or not the set option is in the "toll road preference to transit point" mode that the vehicle preferentially moves on a toll road to the transit point. If the "toll road preference to transit point" mode is set, it is further judged at S506 whether or not the "toll road preference from transit point" mode is set. If both the "toll road preference to transit point" and "toll road preference from transit point" modes are set, at least one toll road existing from the present vehicle position to the transit point is preferentially searched for and selected while at least one toll road existing from the transit point to the destination is preferentially searched for and selected (S507). A route including these data is then displayed (S512).

If the "no toll road preference to transit point" mode is set at S506, at least one toll road existing from the present vehicle position to the transit point is preferentially searched and selected while the general road from the transit point to the destination is selected (S508). A route containing these data is displayed (S512).

If the "no toll road preference to transit point" mode is set, it is further judged at S509 whether or not the set option is the "no toll road preference from transit point". If the "toll road preference from transit point" is set, the general road is searched for and selected without selection of any toll road existing from the present vehicle position to the transit point while at least one toll road existing from the transit point to the destination is preferentially searched for and selected (S510). A route containing these data is then displayed (S512).

If the "no toll road preference from transit point" is set at S509, the general road from the present vehicle position to the transit point is searched for and selected without selection of any toll road while the general road from the transit point to the destination is searched for and selected without selection of any toll road (S511). A route including these data is displayed (S512).

In the route-guidance system of this embodiment, the driver can suitably set a transit point and select either of the "toll road preference to transit point" or "toll road preference from transit point" mode such that the vehicle can satisfactorily be guided along the selected route.

Figure 10:
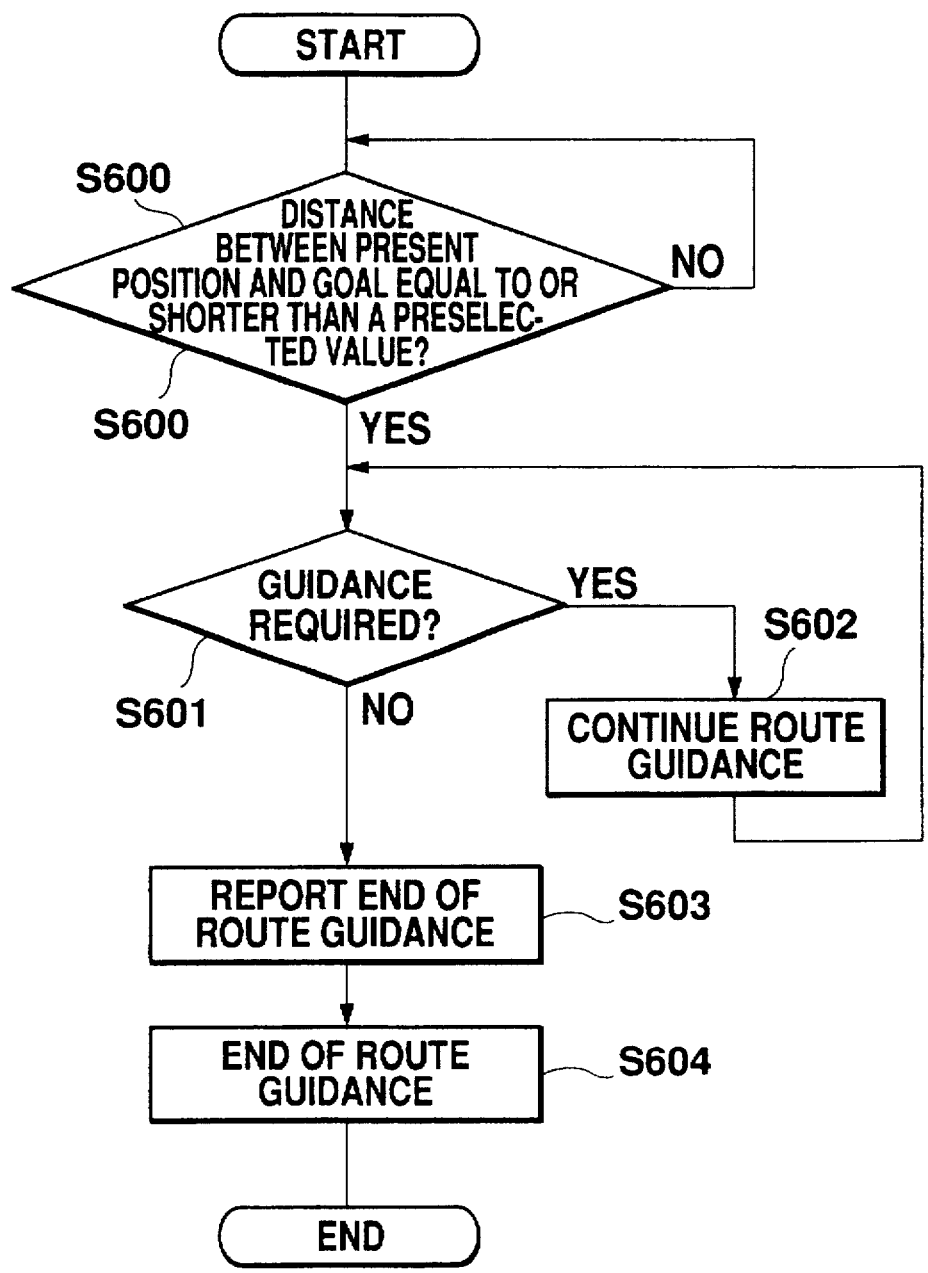
FIG. 10 is a flowchart illustrating the procedure when it is judged that the vehicle approaches the destination and whether or not the route-guidance should be terminated.
Figure 11:
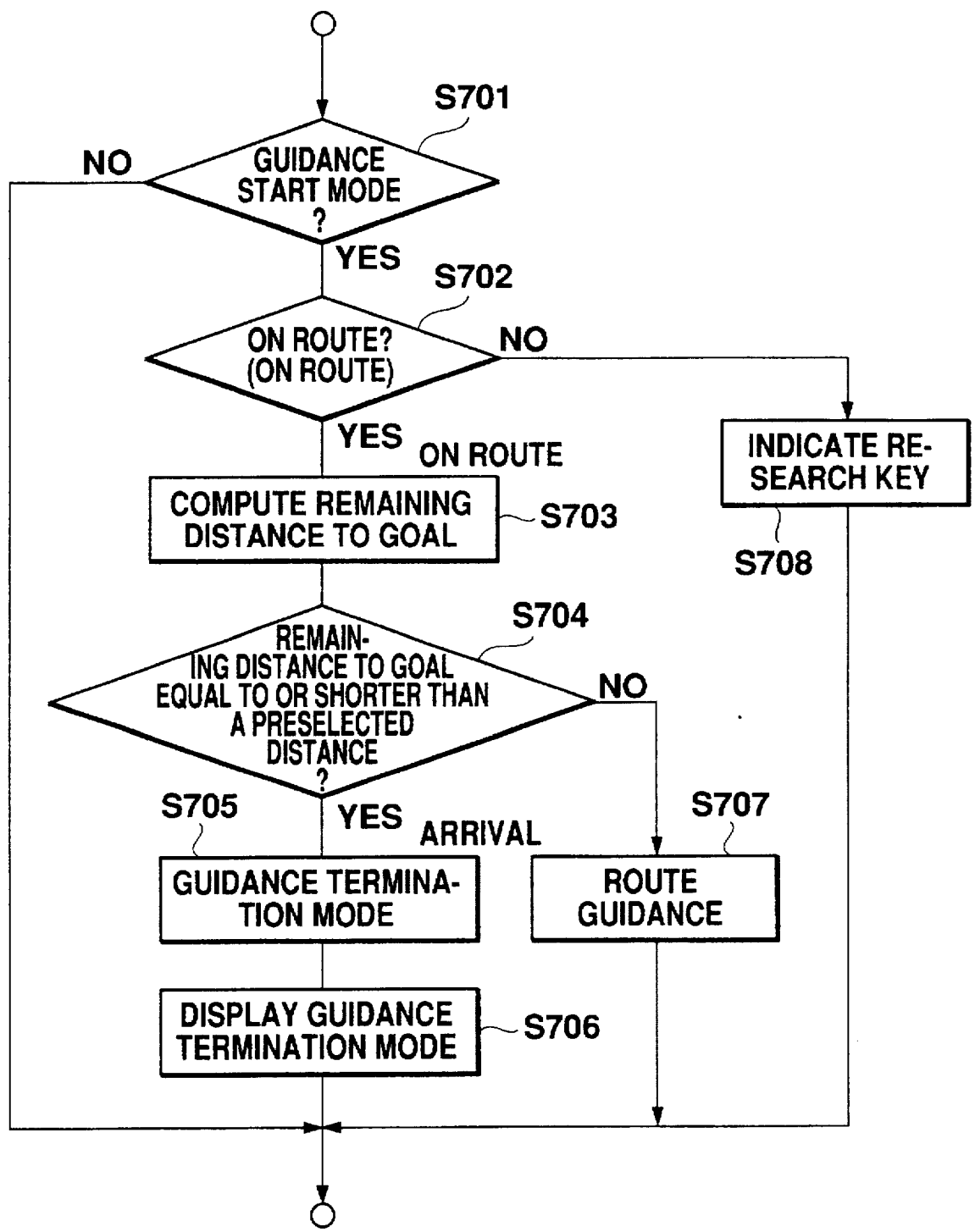
FIG. 11 is a flowchart illustrating the procedure when the route-guidance is re-started after being once terminated.
Figure 12:
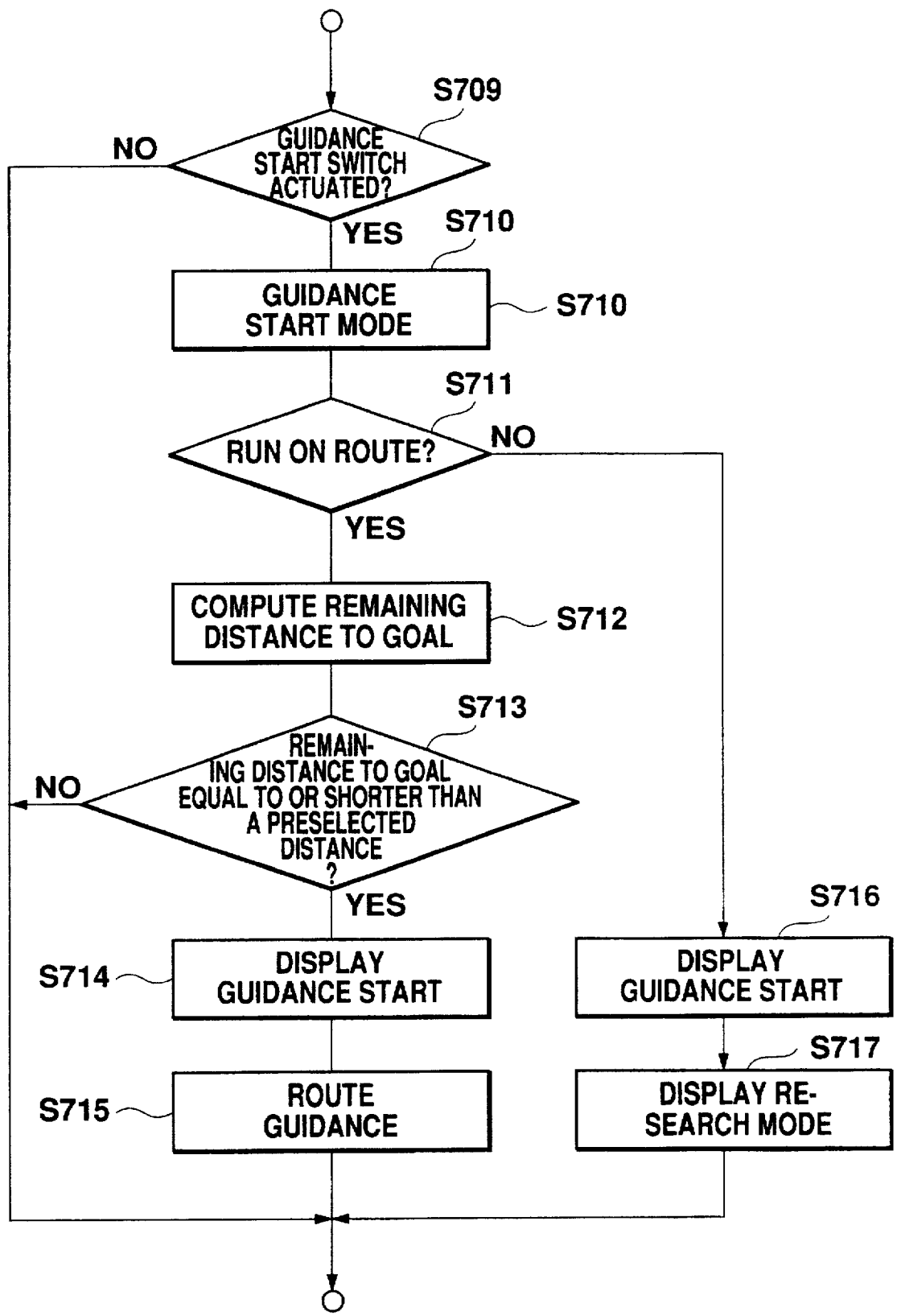
FIG. 12 is a flowchart illustrating the procedure when the route-guidance is re-started after being once terminated.

With reference to FIGS. 1 and 10, a procedure performed when the vehicle approaches the destination and when the route-guidance is terminated will be described in detail.

As described, the present position of the vehicle is measured by the present position measuring unit 20 through the GPS receiver 12, azimuth sensor 14, steering sensor 16 and distance sensor 18. An approach judging unit 44 monitors a distance between the present vehicle position thus measured and the destination stored in the route storage unit 28 at all times (S600). If the distance becomes equal to or less than a predetermined value, the approach judging unit 44 judges that the vehicle approaches the destination. After such a judgment, the procedure proceeds to a step S601 wherein a guidance termination judging unit 46 judges whether or not there is a point at which the route-guidance should be made between the present vehicle position and the destination. In other words, it is judged whether or not the route-guidance to the destination has already terminated. If so, it will be judged that the vehicle has arrived at the destination. The route-guidance may be terminated without a problem. On the other hand, if the selected route still includes any intersecting point at which the vehicle must turn to the right or left, the route-guidance should be continued. The process thus proceeds to a step S602 if there is still a guidance execution point wherein the route-guidance must be made between the present vehicle position and the destination. After the route-guidance has been made at this point, the process returns back to step S601. If there is no guidance execution point from the present vehicle position to the destination, a termination unit 48 in the route-guidance control unit 30 indicates that the route-guidance terminates. Further, both the voice control and display units 34, 32 report the termination of route-guidance to the driver in both an audible and a visual manner (S603). Such a report may be made in only one of the audible or visual manners. Thereafter, the termination unit 48 terminates the route-guidance (S604).

In this embodiment, the aforementioned distance is set to be 200 meters. When the vehicle approaches a point spaced 200 meters away from the destination and if there is no guidance execution point between such a point and the destination, it is judged that the vehicle has arrived at the destination. The route-guidance will then be terminated.

If a transit point is specified during the search of the route, such a transit point is also treated in the same way as the destination. More particularly, when the vehicle approaches a point spaced away from the specified transit point by a given distance (200 meters in this embodiment) and if the route-guidance to that transit point is completed, the route-guidance will be terminated. A new route-guidance part from the transit point to the final destination or the next transit point will be initiated.

An arrival judging unit 50 in the route-guidance control unit 30 judges whether or not the vehicle arrives at the destination. If it is judged that the vehicle arrives at the destination, the display unit 32 shows a message representing the termination of route-guidance. In this embodiment, further, even after the vehicle has arrived at the destination and the route-guidance has terminated, a guidance start control unit 52 again causes the display unit 32 to show the searched route when the vehicle is on the route and if an instruction of start is input into the system through the input section 22.

FIGS. 11-14 show flowcharts of a procedure carried out by the computing unit 24 of this embodiment. First of all, it is judged whether or not the system is in a guidance start mode (S701). If an instruction of guidance start has been input into the system through the input section 22, it is then judged whether or not the vehicle is moving on the route (S702). Such a judgment is performed by comparing a sensed present vehicle position with a searched result. If the vehicle is moving on the route, a remaining distance to the destination is then computed (S703). The computed remaining distance is then compared with a predetermined distance (200 meters in this embodiment). If the remaining distance is equal to or longer than the predetermined distance, the route-guidance is continued (S707). If the remaining distance is shorter than the predetermined distance, it is judged that the vehicle has arrived at the destination and the route-guidance is terminated (S705). The display unit 32 changes the scene to another scene in which the termination of route-guidance is indicated. FIGS. 15A and 15B show a scene indicating that the route-guidance is being executed and another scene indicating that the route-guidance is terminated. The termination of route-guidance may be displayed by canceling the indication "On Guidance" of FIG. 15A, as shown in FIG. 15B. In FIGS. 15A and 15B, a circle shows the present position of the vehicle while an arrow indicates the direction of movement of the vehicle. Further, the destination is represented by a double circle.

If it is judged at S702 that the vehicle does not move on the route, the display unit 32 shows a re-search key that prompts driver for a re-search (S708). When the re-search key is actuated, a route from the present vehicle position to the destination will be re-searched, as will be described later.

After it has been judged that the vehicle arrives at the destination and when the route-guidance is terminated, the prior art terminates the entire procedure. In this embodiment, however, it is further judged whether or not the guidance start switch is actuated, as shown by S709 in FIG. 12. If the driver is puzzled when he or she intends to go to a parking area or the like near the destination, the guidance start switch may be re-actuated. At this time, the system is placed in a guidance start mode (S710). It is again judged whether or not the vehicle is moving on the route (S711). A remaining distance between the present vehicle position and the destination is then computed (S712). It is further judged whether or not the remaining distance is equal to or longer than a predetermined distance (200 meters) (S713). If the remaining distance is equal to or longer than the predetermined distance, the guidance start control unit 52 again causes the display unit to indicate a scene representing the guidance start (S715). Steps S711–S715 are similar to the aforementioned steps S702–S707.

Figure 16A:
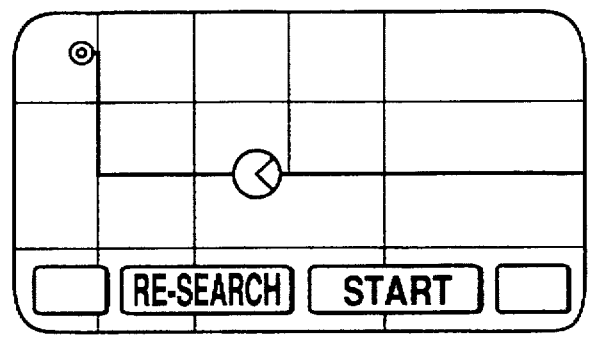
FIG. 16A is the display screen showing the position of the vehicle on the route after the arrival of the vehicle at the destination has been judged.
Figure 16B:
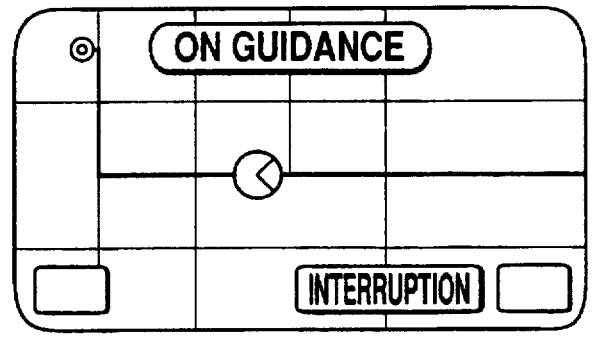
FIG. 16B is the display screen showing when the vehicle is again guided.

FIG. 16A shows a scene in the display unit 32 which indicates that the vehicle is again moving on the route after its arrival at the destination has been judged while FIG. 16B shows another scene in which the guidance start control unit 52 makes a route-guidance after the guidance start switch has again been actuated. At this time, a message, "On Guidance", is again shown.

If it is judged that the vehicle is not moving on the route, the guidance start control unit 52 causes the display unit 32 to show a scene representing the start of guidance (S716) and also to indicate the same re-search key as in S708 (S717). See the lower part of FIG. 16A.

Figure 13:
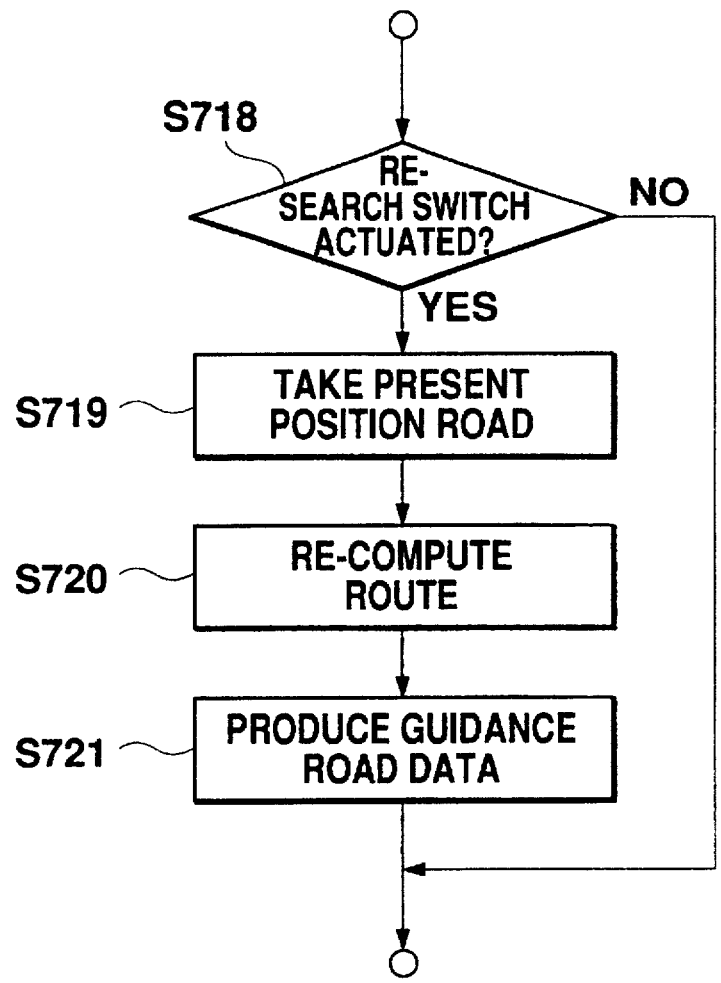
FIG. 13 is a flowchart illustrating the procedure when the route-guidance is re-started after being once terminated.

FIG. 13 is a flowchart of a procedure in the re-search operation. First of all, it is judged whether or not the re-search key as shown in S708 or S717 is actuated (or the touch-sensitive switch is contacted by the operator) (S718). When the driver is puzzled and if the vehicle is on the route, the re-search key will be actuated. When the research key is actuated, the present vehicle position is determined by the present position measuring unit 20 (S719) and a re-computing unit in the route computing unit 26 uses data from the guidance data storage unit 10a to re-search a route to the destination (S720). Such a re-search is similar to the first-mentioned search carried out as by for example the Dykistra method. The system forms guidance or road data (S721) which in turn is stored in the route storage unit 28.

Figure 17A:
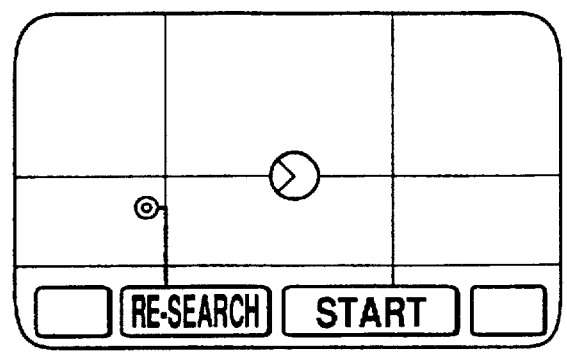
FIG. 17A is the display screen showing that the vehicle is out of the route after the arrival of the vehicle at the destination has been judged.
Figure 17B:
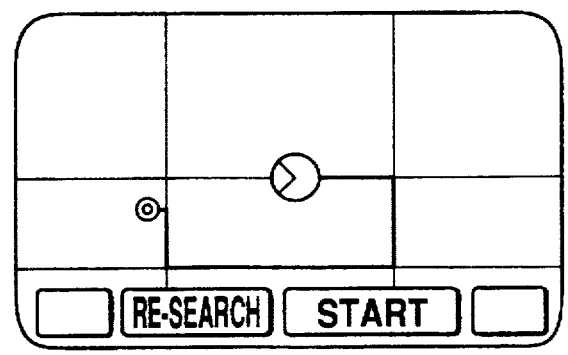
FIG. 17B is the display screen showing that the researching step is initiated.
Figure 17C:
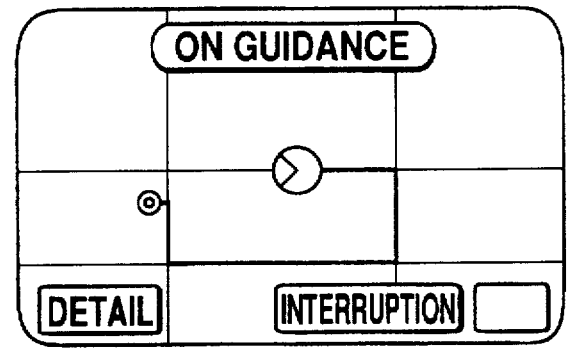
FIG. 17C is the display screen showing that the route-guidance is being carried out after the re-searching step has terminated.

FIGS. 17A, 17B and 17C show scenes used on the aforementioned re-search. FIG. 17A is a scene similar to that of FIG. 15B, showing a situation after the vehicle has arrived at the destination. However, FIG. 17A is different from FIG. 15B in that in FIG. 17A, the present position of the vehicle is not on the route (shown by a thick line). When the re-search key, shown in the lower part of this scene, is actuated by the driver, the re-search operation is initiated to indicate a re-searched route, as shown in FIG. 17B. If the guidance start switch is actuated in this state, a route-guidance corresponding to the re-searched result is initiated.

At this time, the display unit again indicates a message representing "On Guidance".

Figure 14:
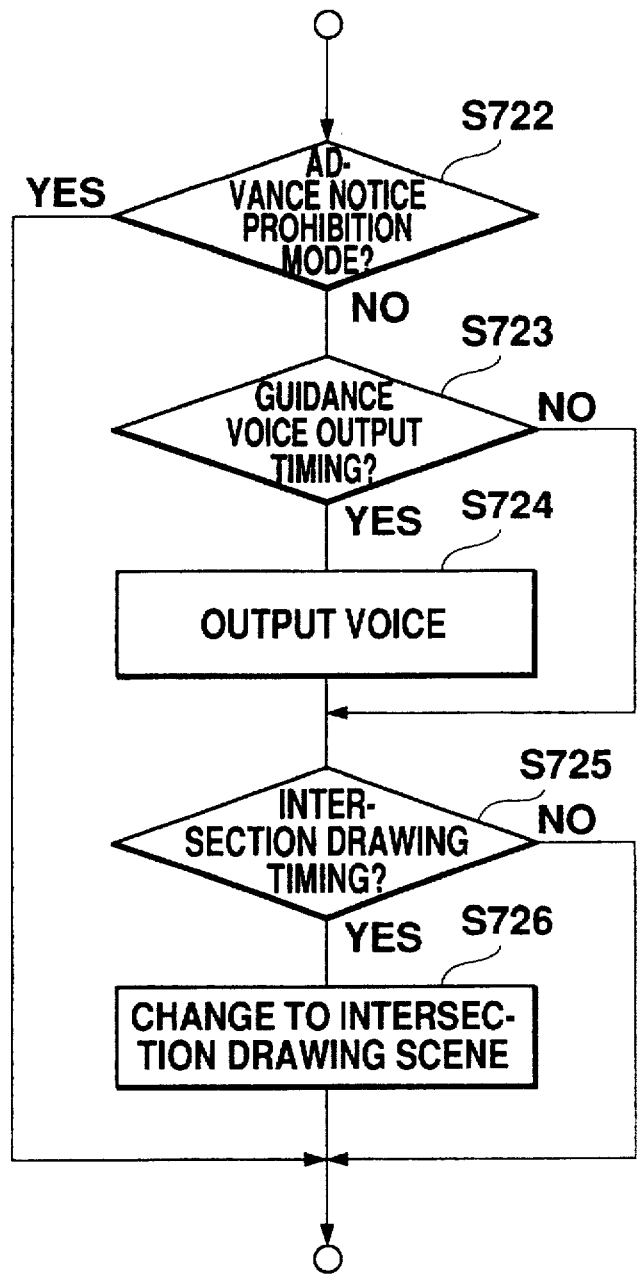
FIG. 14 is a flowchart illustrating the procedure when the route-guidance is re-started after being once terminated.
Figure 15A:
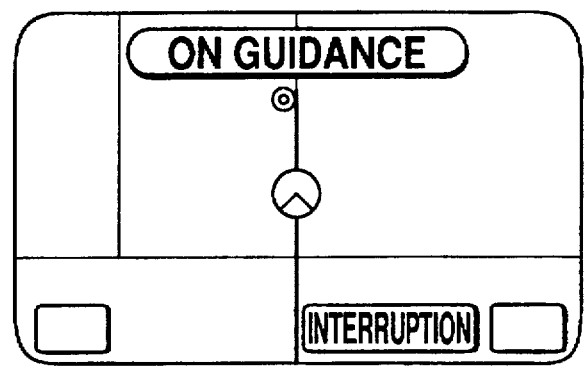
FIG. 15A is a display screen showing the position of the vehicle before it arrives at the destination.
Figure 15B:
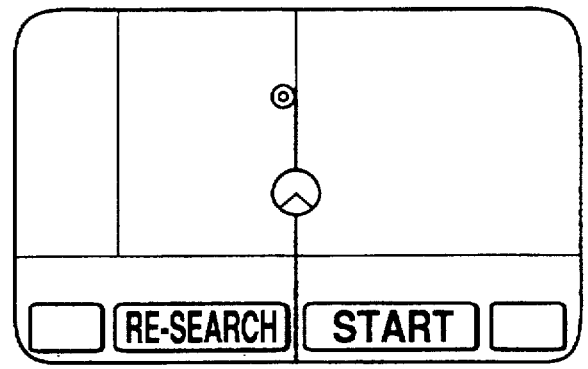
FIG. 15B is the display screen showing the position of the vehicle after it has arrived at the destination.

If a voice route-guidance is to be made in addition to the indication of the route on the display unit 32, voice treatment is carried out as shown in a flowchart of FIG. 14. More particularly, it is judged at S722 whether or not the system is in an advance announcement (voice guidance) prohibition mode (S722). If the prohibition mode is not instructed through the input section 22, it is then judged whether or not there is a guidance voice output timing (S723). If so, the voice control unit 34 is instructed to output the sound (S724). When the vehicle arrives at a point near an intersection (S725), the scene in the display unit is changed to another scene showing that intersection and the voice guidance is carried out (S726).

Since the route-guidance system of this embodiment restarts the route-guidance through the guidance start switch, rather than the termination of the route-guidance, even after the vehicle has arrived at the destination, the vehicle can be precisely guided to the destination even if the driver is puzzled at an area near the destination or even if the vehicle has moved past the destination.

It is to be understood that the present invention is not limited to the aforementioned embodiment thereof, but may be carried out in various forms within departing from the scope of the invention.

We claim:

1. A route-guidance system for a vehicle comprising:

means for storing data relating to a route from a start position to a destination;

means for continuously detecting a present position of said vehicle;

approach judgement means for judging that said vehicle has reached a location spaced before said destination by a predetermined distance by continuously monitoring a distance between said detected present position and said destination and comparing said monitored distance to said predetermined distance;

guidance termination judging means for judging whether a final route-guidance has been performed; and guidance terminating means for terminating said route-guidance and providing a message which indicates a relationship between said present position and said destination to place an operator of said vehicle on notice that said route-guidance is terminated responsive to said vehicle reaching said location spaced before said destination and said final route-guidance having been performed.

2. A route-guidance system according to claim 1, wherein said approach judgement means takes into account at least one of:

a predetermined inaccuracy of said means for detecting said present position of said vehicle; and a predetermined inaccuracy of said stored data with respect to a position of said destination.

3. A method of guiding a vehicle under a route-guidance, said method comprising steps of:

storing data relating from a start position to a route to a destination;

continuously detecting a present position of said vehicle;

judging that said vehicle has reached a location spaced before said destination by a predetermined distance by continuously monitoring a distance between said detected present position and said destination and comparing said monitored distance to said predetermined distance;

judging whether a final route-guidance has been performed; and terminating said route-guidance and providing a message which indicates a relationship between said present position and said destination to place an operator of said vehicle on notice that said route-guidance has terminated responsive to said vehicle reaching said location spaced before said destination and said final route-guidance having been performed.

4. A method of guiding a vehicle under a route-guidance according to claim 3, wherein said step of judging that said vehicle has approached said location spaced before said destination by said predetermined amount takes into account at least one of:

a predetermined inaccuracy of said step of detecting said present position of said vehicle; and a predetermined inaccuracy of said stored data with respect to a position of said destination.

5. A route-guidance system for a vehicle comprising:

means for storing data relating to a route from a start position to a destination;

means for continuously detecting a present position of said vehicle; and route-guidance control means for controlling a route guidance of said route-guidance system on a basis of said present position of said vehicle and on a basis of said data relating to said route, said control means including:

approach judgement means for detecting that a distance between said present vehicle position and said destination is at not greater than a predetermined value to judge whether said vehicle is approaching said destination, and means for terminating said route-guidance and providing a message which indicates a relationship between said present position and said destination to place an operator of said vehicle on notice that said route-guidance has terminated responsive to said approach judgement means judging that said vehicle is approaching said destination.

6. A route-guidance system according to claim 5, wherein said route-guidance control means and said approach judgement means take into account at least one of:

a predetermined inaccuracy in said means for detecting said present position of said vehicle; and a predetermined inaccuracy in said stored data with respect to a position of said destination.

7. A route-guidance system for a vehicle comprising:

means for storing data relating to a route from a start position to a destination;

means for continuously detecting a present position of said vehicle; and route-guidance control means for controlling a route guidance on a basis of said present position of said vehicle and on a basis of said data relating to said route, said control means including:

means for checking said data stored in said means for storing data to judge whether a final route-guidance has been issued, and means for terminating said route-guidance and providing a message which indicates a relationship between said present position and said destination to place an operator of said vehicle on notice that said route-guidance has terminated before said vehicle reaches said destination responsive to said means for checking said data judging that said final route-guidance has been issued.

8. A route-guidance system according to claim 7, wherein said route-guidance control means and said means for terminating said route-guidance with a message take into account at least one of:

a predetermined inaccuracy in said means for detecting said present position of said vehicle; and a predetermined inaccuracy in said stored data with respect to a position of said destination.

9. A route-guidance system for a vehicle comprising:

means for storing data relating to a route from a start position to a destination;

means for continuously detecting a present position of said vehicle; and route-guidance control means for controlling a route guidance on a basis of said present position of said vehicle and on a basis of said data relating to said route, said control means including:

approach judgement means for detecting that a distance between said present position of said vehicle and said destination is not greater than a predetermined value to judge that said vehicle is approaching said destination, final guidance judgement means for checking said data stored in said route-storing means to judge whether a final guidance to said destination has been issued responsive to said detected distance between said present position of said vehicle and said destination being not greater than a predetermined value, and means for terminating said route-guidance and providing a message which indicates a relationship between said present position and said destination to place an operator of said vehicle on notice that said route-guidance has terminated responsive to said vehicle is approaching said destination and said final guidance having been issued.

10. A route-guidance system according to claim 9, wherein said approach judgement means, said final guidance judgement means, and said means for terminating said route-guidance all take into account at least one of:

a predetermined inaccuracy in said means for detecting said present position of said vehicle; and a predetermined inaccuracy in said stored data with respect to a position of said destination.

11. A route-guidance system for a vehicle comprising:

means for setting a desired transit point;

means for storing data relating to a route from a start position to a destination via said transit point;

means for continuously detecting a present position of said vehicle; and means for controlling route-guidance based on said present position of said vehicle and based on said route to a destination via said transit point, said controlling means including:

means for comparing said detected present position of said vehicle with said transit point to judge whether said vehicle has passed through said transit point, said controlling means issuing route-guidance from said present position of said vehicle to said transit point responsive to said vehicle having not yet passed said transit point, and said controlling means issuing route-guidance from said present position of said vehicle to said destination responsive to said vehicle having passed through said transit point.

12. A route-guidance system according to claim 11, wherein said means for comparing said detected position of said vehicle with said transit point takes into account at least one of:
- a predetermined inaccuracy in said means for detecting said present position of said vehicle; and
- a predetermined inaccuracy in said stored data with respect to a position of said destination.

13. A route-guidance system for a vehicle comprising:
- means for storing data relating to a route from a start position to a destination;
- means for continuously detecting a present position of said vehicle;
- control means for controlling route-guidance based on said present position of said vehicle and based on said data relating to said route to said destination; and
- restart directing means for directing a restart of said route-guidance;
- said control means including:
  - means for detecting that a distance between said present position of said vehicle and said destination is not greater than a predetermined value to judge that said vehicle is approaching said destination,
  - means for terminating said route guidance responsive to said distance being not greater than said predetermined value, and
  - means for judging whether said present position of said vehicle is on said route to said destination,
  - wherein route-guidance by said control means is started again after being terminated by said terminating means responsive to an instruction from said restart directing means if said detection means does not detect that a distance between said present position of said vehicle and said destination is not greater than said predetermined value and said judging means judges that said vehicle is on said route.

14. A route-guidance system according to claim 13, wherein said means for detecting that said distance between said present position of said vehicle and said destination takes into account at least one of:
- a predetermined inaccuracy in said means for detecting said present position of said vehicle; and
- a predetermined inaccuracy in said stored data with respect to a location of said destination.

15. A method of guiding a vehicle using route-guidance, said method comprising steps of:
- storing data relating to a route from a start position to a destination;
- continuously detecting a present position of said vehicle; and
- controlling said route-guidance on a basis of said present position and on a basis of said vehicle and said data relating to said route, said step of controlling said route-guidance including steps of:
  - judging whether said vehicle is approaching said destination by detecting that a distance between said present vehicle position and said destination is not greater than a predetermined value, and
  - terminating said route-guidance and providing a message which indicates a relationship between said present position and said destination to place an operator of said vehicle on notice that said route-guidance has terminated responsive to said vehicle being judged to be approaching said destination.

16. A route-guidance system according to claim 15, wherein said step of judging takes into account at least one of:
- a predetermined inaccuracy in said step of detecting said present position of said vehicle; and
- a predetermined inaccuracy in said stored data with respect to a location of said destination.

17. A method of guiding a vehicle using route-guidance, said method comprising steps of:
- storing data relating to a route from a start position to a destination;
- continuously detecting a present position of said vehicle; and
- controlling said route-guidance on a basis of said present position of said vehicle and on a basis of said data relating to said route, said step of controlling said route-guidance including steps of:
  - judging whether a final route-guidance has been issued using said stored data relating to said route to said destination, and
  - terminating said route-guidance and providing a message which indicates a relationship between said present position and said destination to place an operator of said vehicle on notice that said route-guidance has terminated before said vehicle reaches said destination responsive to said final route-guidance having been issued.

18. A route-guidance system according to claim 17, wherein said step of controlling said route-guidance takes into account at least one of:
- a predetermined inaccuracy in said step of detecting said present position of said vehicle; and
- a predetermined inaccuracy in said stored data with respect to a location of said destination.

19. A method of guiding a vehicle using route-guidance, said method comprising steps of:
- storing data relating to a route from a start position to a destination;
- continuously detecting a present position of said vehicle; and
- controlling said route-guidance on a basis of said present position of said vehicle and on a basis of said data relating to said route, said step of controlling said route-guidance including steps of:
  - judging that said vehicle is approaching said destination by detecting that a distance between said present position of said vehicle and said destination is not greater than a predetermined value,
  - judging whether a final guidance to said destination has been issued by checking said stored data relating to said route to said destination responsive to said detected distance between said present position of said vehicle and said destination being not greater than a predetermined value, and
  - terminating said route-guidance and providing a message which indicates a relationship between said present position and said destination to place an operator of said vehicle on notice that said route-guidance has terminated responsive to said vehicle being judged to be approaching said destination and said final guidance to said destination having been issued.

20. A route-guidance system according to claim 19, wherein said step of judging that said vehicle is approaching said destination, and said step of judging whether or not said final guidance to said destination has been issued, take into account at least one of:
- a predetermined inaccuracy in said step of detecting said present position of said vehicle; and a predetermined inaccuracy in said stored data with respect to a location of said destination.

21. A method of guiding a vehicle using route-guidance, said method comprising steps of:

setting a desired transit point;

storing data relating to a route from a start position to a destination via said transit point;

continuously detecting a present position of said vehicle; and controlling said route-guidance based on said present position of said vehicle and based on said route to a destination via said transit point, said step of controlling said route-guidance including steps of:

judging whether said vehicle has passed through said transit point by comparing said detected present position of said vehicle with said transit point, issuing route-guidance from said present position of said vehicle to said transit point responsive to said vehicle having not yet passed said transit point, and issuing route-guidance from said present position of said vehicle to said destination responsive to said vehicle having passed through said transit point.

22. A route-guidance system according to claim 21, wherein said step of judging that said vehicle has passed through said transit point takes into account at least one of:

a predetermined inaccuracy in said step of detecting said present position of said vehicle; and a predetermined inaccuracy in said stored data with respect to a location of said destination.

23. A method of guiding a vehicle using route-guidance, said method comprising steps of:

storing data relating to a route from a start position to a destination;

continuously detecting a present position of said vehicle;

controlling said route-guidance based on said present position of said vehicle and based on said data relating to said route to said destination, said step of controlling said route-guidance including steps of:

judging that said vehicle is approaching said destination by detecting that a distance between said present position of said vehicle and said destination is not greater than a predetermined value, terminating said route guidance responsive to said distance being not greater than said predetermined value, and judging whether said present position of said vehicle is on said route to said destination, restarting said route-guidance after said route-guidance was previously terminated in said terminating step responsive to a failure to detect that a distance between said present position of said vehicle and said destination is not greater than said predetermined value and a determination that said vehicle is on said route to said destination.

24. A route-guidance system according to claim 23, wherein said step of judging that said vehicle is approaching said destination takes into account at least one of:

a predetermined inaccuracy in said step of detecting said present position of said vehicle; and a predetermined inaccuracy in said stored data with respect to a location of said destination.

* * * * *